United States Patent [19]

Yamada

[11] Patent Number: 4,460,934
[45] Date of Patent: Jul. 17, 1984

[54] MAGNETIC HEAD WITH FULL AND PARTIAL COILS FOR AZIMUTH INFORMATION

[75] Inventor: Fumiaki Yamada, Akishima, Japan

[73] Assignee: Nakamichi Corporation, Tokyo, Japan

[21] Appl. No.: 457,064

[22] Filed: Dec. 22, 1982

[30] Foreign Application Priority Data

Dec. 28, 1981 [JP] Japan .................. 56-214093

[51] Int. Cl.³ .................... G11B 5/20; G11B 5/43
[52] U.S. Cl. .................... 360/12.3; 360/76; 360/121
[58] Field of Search ............ 360/76, 26, 121, 123

[56] References Cited

U.S. PATENT DOCUMENTS

| 2,938,962 | 5/1960 | Konins et al. | 360/76 |
| 4,074,328 | 2/1978 | Hardwick | 360/76 X |
| 4,101,937 | 7/1978 | Jenkins | 360/76 |
| 4,317,144 | 2/1982 | De Niet et al. | 360/109 X |

Primary Examiner—John H. Wolff
Attorney, Agent, or Firm—Pearne, Gordon, Sessions, McCoy, Granger & Tilberry

[57] ABSTRACT

This invention relates to a magnetic head for providing azimuth information therefrom relative to a signal recorded on a magnetic tape. The magnetic head of the invention has first and second coils for providing a reproduced signal corresponding to a recorded signal on the entire width of a recording track and a reproduced signal corresponding to a recorded signal on a part of width of the said recording track.

3 Claims, 5 Drawing Figures

MAGNETIC HEAD WITH FULL AND PARTIAL COILS FOR AZIMUTH INFORMATION

BACKGROUND OF THE INVENTION

In a magnetic recording and reproducing apparatus, an optimum playback characteristic can be obtained if an azimuth position of a reproducing head is correctly adjusted relative to a signal recorded on a magnetic tape.

U.S. Pat. No. 4,317,144 discloses a method of adjusting an azimuth position of a reproducing head by separately scanning an upper half and a lower half of a single track on which an identical signal is recorded. According to this method, the azimuth position of the reproducing head can be automatically adjusted relative to a signal recorded on a prerecorded tape such as a music tape without using conventional test signals recorded on two different tracks.

SUMMARY OF THE INVENTION

Accordingly, it is a principal object of the invention to provide a magnetic head adapted to be used in an azimuth adjusting method.

In accordance with the invention, there is provided a magnetic head for reproducing a signal recorded on a magnetic tape, said magnetic head comprising; a single core having a gap corresponding to a recording track of said magnetic tape, said core including left-hand and right-hand core pieces and one of said core pieces being divided into upper and lower core pieces; a first coil wound on said core to encircle the entire core; a second coil wound to encircle only one of said upper and lower core pieces; and means responsive to reproduced signals picked up from said first and second coils and having an output to adjust the azimuth position of said magnetic head relative to a recorded signal on said recording track.

BRIEF DESCRIPTION OF THE DRAWINGS

The above and other objects and features of the invention will be apparent from the description of the embodiment taken along with reference to the accompanying drawing in which.

DETAILED DESCRIPTION OF THE EMBODIMENT

Figure 1:
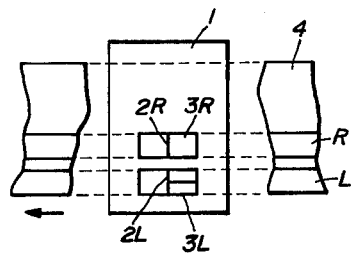
FIG. 1 illustrates a magnetic head and tape configuration.

Referring now to FIG. 1, there is shown a magnetic head 1 constructed in accordance with an embodiment of the invention. The magnetic head 1 is of such a recording and reproducing type that the same gaps 2L and 2R are used in both record mode and playback mode.

Figure 2:
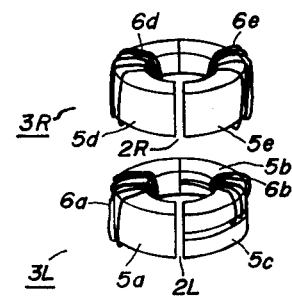
FIG. 2 shows an enlarged perspective view of a core construction of the magnetic head.

The magnetic head 1 comprises right and left channel cores 3L and 3R having gaps 2L and 2R corresponding to recording tracks L and R of a magnetic tape 4 on which stereo audio signals are recorded, respectively. As shown in FIG. 2, each of the cores 3L and 3R is divided into left-hand and right-hand core pieces facing each other. The left-hand core piece 5a of the left channel core 3L is non-divided, but the right-hand core piece of it is divided in the direction of the width of the recording track into upper and lower core pieces 5b and 5c with a nonmagnetic layer (not shown) placed therebetween. Both core pieces 5d and 5e of the right channel core 3R are non-divided. A coil 6a is wound on the left-hand core piece 5a of the left channel core 3L while a coil 6b is wound on the upper core piece 5b. Coils 6d and 6e are wound on the core pieces 5d and 5e of the right channel core 3R, respectively.

Figure 3:
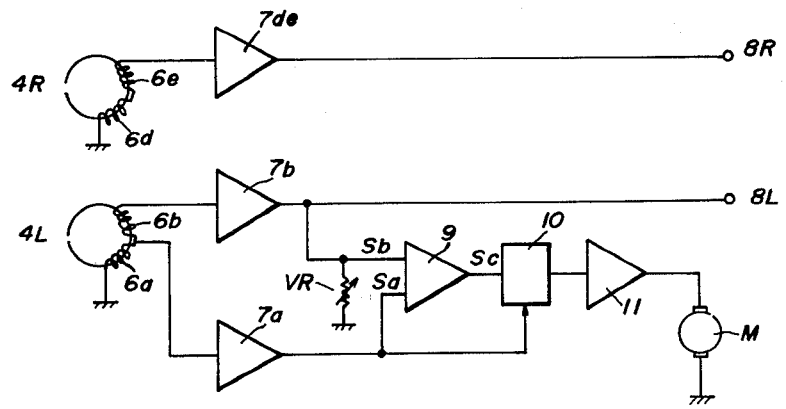
FIG. 3 shows an example of a circuit for adjusting the azimuth position of the magnetic head.

FIG. 3 shows a circuit for adjusting an azimuth position of the magnetic head 1. Although a recording circuit is omitted in FIG. 3, it should be understood that when a record mode is selected, the magnetic head is switched from the reproducing circuit to the recording circuit so that stereo recording signals are supplied to the coils 6a and 6d of the left and right channel cores 3L and 3R, respectively.

A reproducing amplifier 7a has an input connected to the coil 6a while a reproducing amplifier 7b has an input connected to the coils 6a and 6b connected in series to each other. An output of the amplifier 7b is connected to an audio output terminal 8L so that the reproduced audio signal for the left channel is supplied thereto. A differential amplifier 9 has two inputs, to one of which an output signal Sb from the amplifier 7b is supplied through an attenuator VR and to the other of which an output signal Sa from the amplifier 7a is supplied. The differential amplifier 9 generates a differential signal Sc in accordance with the phase difference between the two signals Sa and Sb which are adjusted to have the same levels by the attenuator VR. A phase detector 10 detects the phase of the differential signal Sc relative to a reference of a zero crossing point of the reproduced signal Sa to generate a control signal. This control signal is supplied to a driving circuit 11 for an azimuth adjusting electric motor M which drives an adjusting element such as a screw to adjust the azimuth position of the magnetic head 1.

A reproducing amplifier 7de has an input connected to the coil 6e which is connected in series to the coil 6d and an output connected to an output terminal 8R so that the reproduced audio signal for the right channel is supplied thereto.

Figure 4A:
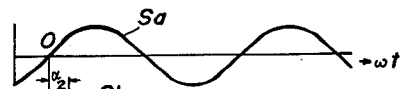
FIGS. 4A and 4B illustrate waveforms of reproduced signals from the magnetic head.
Figure 4B:
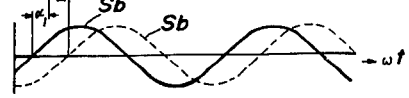

In operation, in the playback mode in which the magnetic head 1 is used as a reproducing head, the reproduced signals Sa and Sb are separately picked up by the coils 6a and 6a+6b from the same recording track L of the magnetic tape 4. If the magnetic head 1 is inclined in a clockwise direction as viewed in FIG. 1 relative to the recorded signal on the magnetic tape, so that the phase of the reproduced signal Sb advances by the degree of $\alpha_1$ relative to that of the reproduced signal Sa, a waveform of the reproduced signal Sa is as shown in FIG. 4A while a waveform of the reproduced signal Sb is as shown by a solid line of FIG. 4B. Thus, it will be noted that the reproduced signal Sa is indicated by $A \sin \omega t$ while the reproduced signal Sb is indicated by $A \sin (\omega t + \alpha_1)$. On the other hand, if the magnetic head 1 is inclined in a counterclockwise direction as viewed in FIG. 1, so that the phase of the reproduced signal Sb is retarded by the degree of $\alpha_2$ relative to that of the reproduced signal Sa, a waveform of the reproduced signal Sb is as shown by a dotted line of FIG. 4B. Thus, it will be noted that the reproduced signal Sb is indicated by $A \sin (\omega t - \alpha_2)$.

If the azimuth position of the magnetic head 1 is proper relative to the recorded signal, then the output from the differential amplifier 9 is zero, but if the azimuth position of the magnetic head is not proper, the differential signal Sc is generated by the differential amplifier 9. The phase detector 10 utilizes the zero crossing point of the reproduced signal Sa from a negative polarity to a positive polarity, for example, to discriminate the polarity of the differential signal Sc. More particularly, if the differential signal Sc is positive at the zero crossing point, then the phase detector 10 discriminates that it corresponds to the clockwise inclination of the magnetic head 1, and if the differential signal Sc is negative, then it discrimates that it corresponds to the counterclockwise inclination of the magnetic head 1. It will be understood that if the phase relation between the reproduced signals Sa and Sb is out of order by the phase degree of more than 180°, the above discrimination will be reversed, but this occurrence can be prevented by determining the proper azimuth adjustment range.

If the positive differential signal Sc is detected, then the driving circuit 11 is controlled to reversely rotate the electric motor M so that the magnetic head 1 is inclinatorily moved in a counterclockwise direction to adjust the azimuth position of the magnetic head 1. When the azimuth position of the magnetic head 1 is proper relative to the recorded signal, the differential signal Sc becomes zero so as to stop rotating the motor M. As a result, since the azimuth position of the magnetic head 1 is correctly adjusted relative to the recorded signal, the reproduced audio signals of the left and right channels are supplied from the output terminals 8L and 8R in an optimum condition. If the negative differential signal Sc is detected, the electric motor M is forwardly rotated so that the magnetic head 1 is inclinatorily moved in a clockwise direction to adjust the azimuth position of the magnetic head 1.

Although, in the illustrated embodiment, the left channel core is divided, it will be understood that the right channel core may be divided. The reproduced signals Sa and Sb may be converted into square wave signals which may be compared to form a differential signal varying in its pulse width in response to the phase difference of the square wave signals. The differential pulse signal can control the electric motor. It will be understood that this invention may be applied to a magnetic head only for reproducing or to a multi-channel head.

While one preferred embodiment of the invention has been illustrated and described with reference to the accompanying drawing, it will be understood by those skilled in the art that various changes and modifications may be made without departing from the spirit and scope of the invention, which is intended to be defined only by the appended claim. For example, separate recording and reproducing magnetic heads may be adjusted in their azimuth according to the principle of the invention when audio signals are reproduced while they are being recorded.

What is claimed is:

1. A magnetic head for reproducing a signal recorded on a magnetic tape, said magnetic head comprising;
   a core having a single gap corresponding to a recording track of said magnetic tape, said core including left-hand and right-hand core pieces and one of said core pieces being divided into upper and lower core pieces;
   a first coil wound on said core to encircle the entire core;
   a second coil wound to encircle only one of said upper and lower core pieces; and
   means responsive to reproduced signals picked up from said first and second coils and having an output to adjust the azimuth position of said magnetic head relative to a recorded signal on said recording track.

2. A magnetic head for reproducing a signal recorded on a magnetic tape, said magnetic head comprising;
   a core having a single gap corresponding to a recording track of said magnetic tape, said core having a portion thereof divided into upper and lower core pieces;
   a first coil wound to encircle the entire core and cooperate with said single gap to obtain a reproduced signal; and
   a second coil wound to encircle only one of said upper and lower core pieces and cooperate with only a portion of said single gap; and
   means responsive to the reproduced signals picked up from said first and second coils and having an output to adjust the relative azimuth position of said magnetic head and said recording track.

3. A magnetic head for reproducing a signal recorded on a magnetic tape and providing reproduced signals utilized in detecting an azimuth error thereof relative to said recorded signal, said magnetic head comprising;
   at least a special core having a gap corresponding to a recording track of said magnetic tape, said special core having a portion divided into upper and lower core pieces;
   a first coil wound on said special core to cooperate with the entire core and gap;
   a second coil would on only one of said upper and lower pieces of said divided core pieces to cooperate with only said one core piece and only a portion of said gap; and
   means responsive to a reproduced signal corresponding to said recorded signal on the entire width of said recording track picked up from said first coil and responsive to a reproduced signal corresponding to said recorded signal on a part of the width of said same recording track picked up from said second coil to establish an azimuth error signal.

* * * * *